Patented July 13, 1937

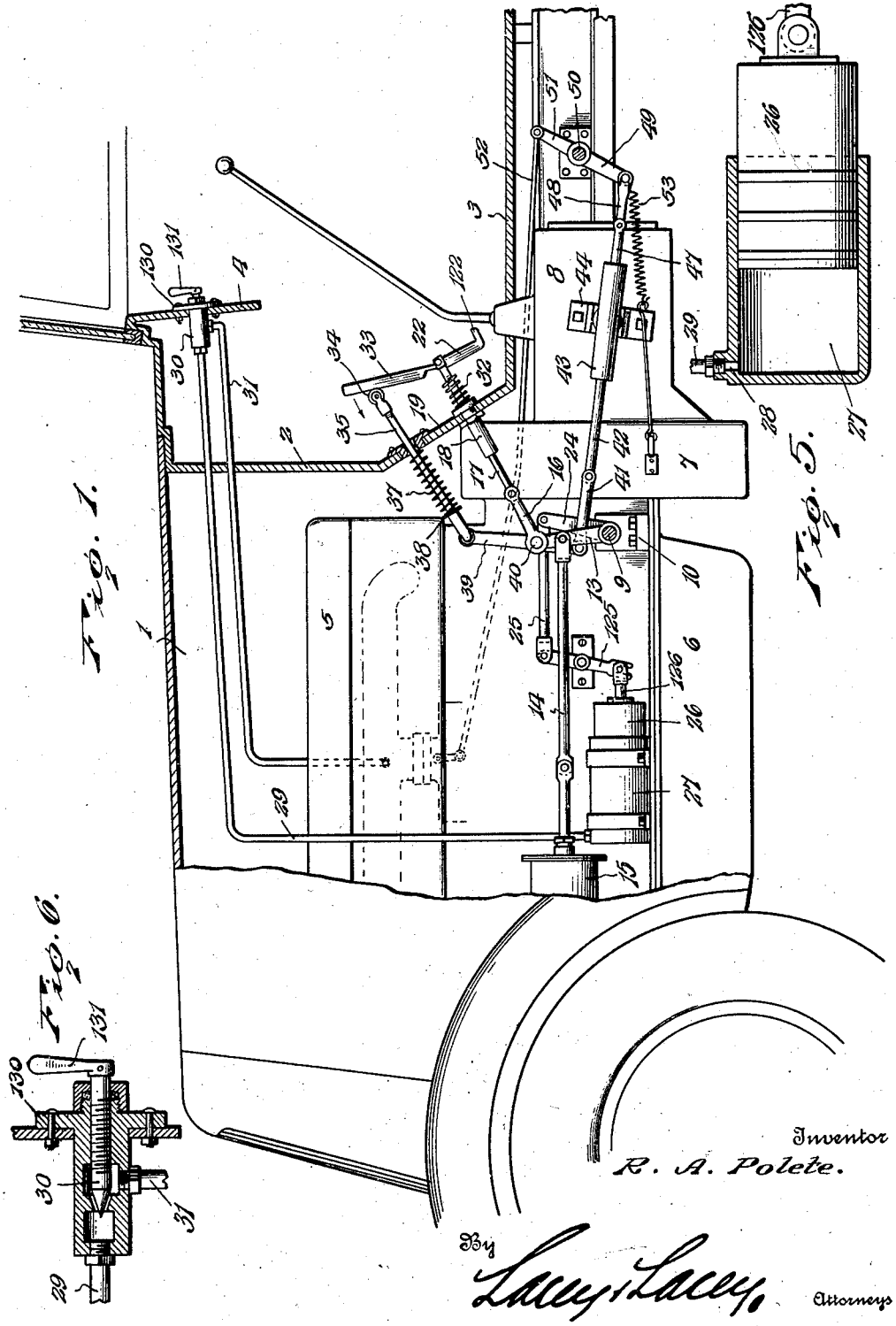

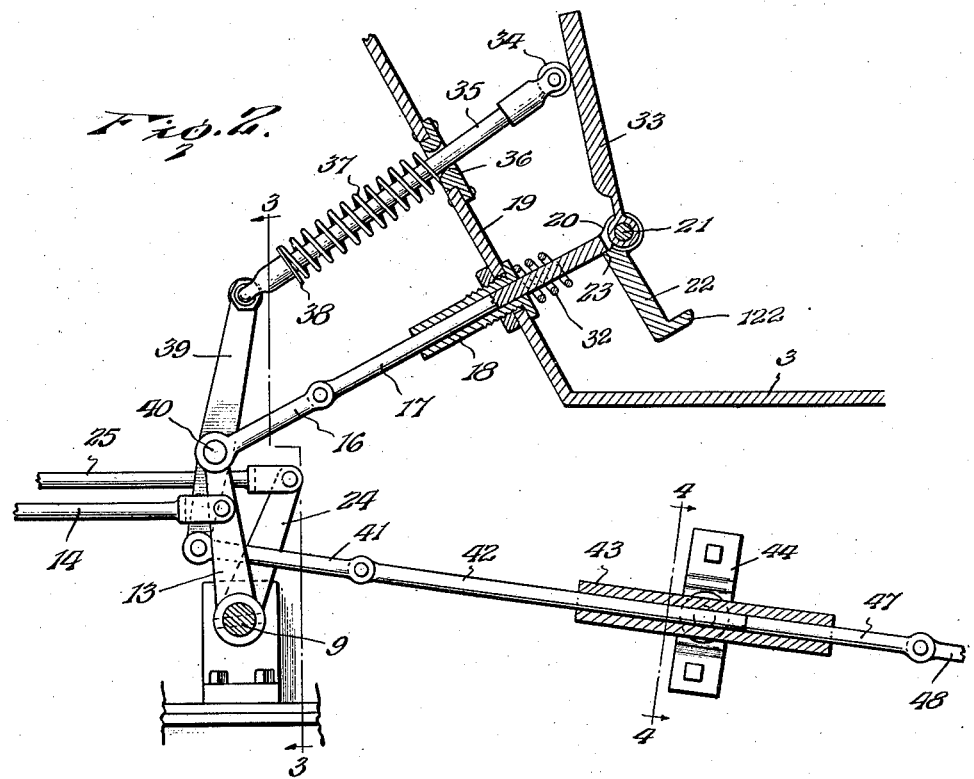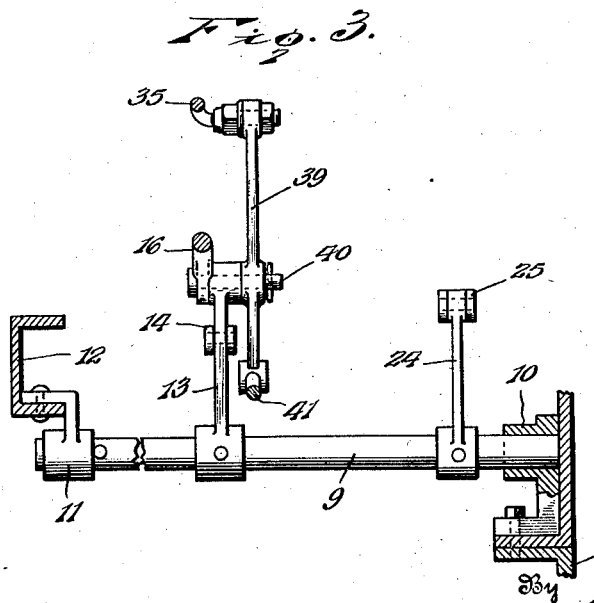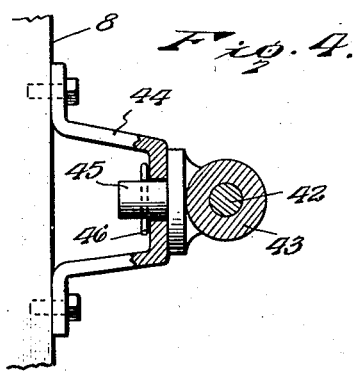

2,087,205

UNITED STATES PATENT OFFICE 2,087,205

MOTOR VEHICLE CONTROL MECHANISM

Ralph A. Polete, St. Louis, Mo.

Application June 18, 1934, Serial No. 731,183

7 Claims. (Cl. 192—3)

This invention relates to mechanism for controlling a motor vehicle and has for its primary object the arrangement of the accelerator and the foot brake in such relation that the chauffeur will have his foot upon the brake pedal at all times, being thereby relieved of the tiring effect of shifting his foot at short intervals to and from the brake pedal as is frequently necessary, especially in crowded traffic. The invention also has for its object the provision of means whereby the accelerator and the foot brake will be controlled from closely associated elements and means will be provided for holding the brake normally released through the action of the suction from the intake manifold of the vehicle engine. The invention also provides means whereby the accelerator rod and the foot brake rod will operate upon a common connection which will be so arranged that when the brake is applied the accelerator will not operate upon the throttle valve and when the accelerator is actuated the foot brake will remain in released position. Mechanism embodying the invention is illustrated in the accompanying drawings and will be hereinafter fully described, the novel features being particularly defined in the claims following the description.

In the drawings:

Figure 1 is a view, partly in elevation and partly in section, of a portion of an automobile having my invention applied thereto.

Figure 2 is an enlarged detail elevation of the controlling mechanism, the associated parts of the vehicle and foot pedal being shown in section.

Figure 3 is a transverse section on the line 3—3 of Figure 2.

Figure 4 is an enlarged detail section on the line 4—4 of Figure 2.

Figure 5 is a detail longitudinal section through the suction cylinder.

Figure 6 is a detail section of the suction-controlling valve.

In order that the invention may be readily understood, I have deemed it advisable to show the essential mechanism in relation to parts of a motor vehicle, and in Figure 1 the reference numeral 1 indicates the hood of a motor vehicle, 2 the dashboard, 3 the floor and 4 the instrument board of the vehicle. The engine block is also indicated at 5 and a crank case at 6, while the clutch case is represented at 7 and the transmission housing at 8, all these parts being of well-known design and illustrated in a conventional manner only.

In carrying out the invention, there is provided a rock shaft 9 which may be mounted in any convenient manner upon the vehicle, being illustrated as having one end mounted in a bearing 10 secured upon the crank case 6 and having its opposite end mounted in a bearing 11 secured upon a side sill 12 of the vehicle chassis. Secured in any convenient manner upon this rock shaft 9 is a rocking arm 13 which rises from the shaft and has pivoted thereto a rod 14 which extends to the master brake cylinder, indicated at 15, and is connected to the piston operating in said cylinder. To the upper end of this upstanding rocking arm 13 is pivoted the forward end of a link 16 which is pivoted at its rear end to the front end of a brake pedal rod 17. The pedal rod 17 is slidably fitted through a bearing sleeve 18 secured in the upwardly inclined portion 19 of the floor of the vehicle and the rear end of this rod, which is disposed at the rear end of the sleeve 18, is formed into a fork 20 carrying a pintle or rod 21. Loosely hung upon this pintle rod 21 is a brake pedal 22, the upper end edge of which is offset forwardly from the pintle, as shown at 23, whereby it is adapted to impinge against the underside of the rod 17 at the base of the fork 20 and be thereby held against swinging under the rod when it is desired to apply the brakes. It will be noted that the lower end of the pedal has a flange 122 constituting a heel rest. By having the pedal loose upon the pintle 21 which also carries an accelerator pedal, the two pedals may be formed as separate units and also individually replaced if one should be broken. As the brake pedal is pivoted to the rod 17, it may be swung upwardly and forwardly out of the way when cleaning the automobile and also movement of the pedal relative to the rod will be permitted if the pedal should strike the floor board when depressed and it will not interfere with full depression of the rod.

There is also secured upon the rock shaft 9, adjacent the bearing 10, an upstanding crank arm 24, to the upper end of which is pivoted the rear end of a connecting rod 25 which extends forwardly in the present arrangement, and is pivoted to the upper end of a lever 125 which is fulcrumed between its ends and has its lower end pivoted to a link 126 which connects it with a piston 26 working in a cylinder 27 which is supported upon the side of the engine block or the upper portion of the crank case in any convenient manner. This cylinder 27 has a port 28 in its upper side at its forward end, the piston 26 working through the open rear end of the cylinder, and in said port 28 is secured the end of a suction pipe 29 which extends to a controlling valve 30 on the instrument board 4. A suction pipe 31 leads from the valve 30 to the intake manifold of the engine and the suction of the manifold may be thereby caused to act upon the piston 26 to hold the brakes normally released. The valve is illustrated as a needle valve having a crank handle 131, and a dial 130 may be secured on the instrument board to cooperate with the handle in indicating the exact position of the valve and regulate the suction acting on the piston. Normally the valve 30 will be opened, as shown in Figure 6, so that suction will be created through the pipes 29 and 31 and a partial vacuum formed in the cylinder to hold the piston 26 in a brake-releasing position and overcome the inactive weight or pressure of the chauffeur's foot upon the pedal 22 so that the brakes will not be accidentally applied. When the brakes are to be applied, pressure is applied with the heel to the pedal 22 and during this operation, the piston is shifted out of the cylinder. Suction through the pipes 29 and 31 must be such that the partial vacuum created in the cylinder will be sufficient to prevent unintentional outward movement of the piston but, at the same time, allow such movement when the brakes are applied. If it is found that the brakes are hard to apply due to too great a vacuum in the cylinder, the valve 30 will be closed in step by step adjustments until suction through the pipes and resultant vacuum in the cylinder has been reduced to such point that the piston can be drawn outwardly when ordinary pressure is exerted and the brakes easily applied. If the brakes apply too easily, the valve will be gradually opened until the proper suction is exerted to create the correct vacuum in the cylinder. After the valve has been correctly set, it will be left in the adjusted position and need not be touched unless another person of lighter or heavier weight is driving the automobile and finds that the brakes are hard to apply or work too freely. A buffer spring 32 is provided between the floor and the pedal 22 so as to cushion the forward movement of the brake pedal rod 17 and prevent damaging impact of the same upon the floorboards or the sleeve 18. When the brakes are again released, the cranks or arms 13 and 24 will rock rearwardly and a pull will be exerted through the rod 25 to rock the lever 125 and push the piston 26 forward.

An accelerator pedal 33 is hingedly or pivotally mounted upon the pintle 21 and extends upwardly therefrom to bear upon a roller 34 which is carried upon the rear end of the accelerator rod 35 which is slidably fitted through a bushing or bearing ring 36 in the portion 19 of the vehicle floor. A buffer spring 37 is provided around the rod 36 between the floor and an abutment 38 on the rod to cushion the return stroke of the rod and yieldably hold the same toward a forward position. The front end of the accelerator pedal rod is pivoted to the upper end of a rocking arm or lever 39 which is fulcrumed between its ends upon the same bolt or pin 40 which constitutes the pivotal connection between the link 16 and the crank arm 13. Pivoted to the lower end of the lever 39 is a link 41 which is pivoted at its rear end to the front end of a pusher rod 42 which is slidably supported at its rear free end within a sleeve or guide 43 carried in a bracket 44 which is secured upon the side of the transmission housing. The guide or sleeve 43 is pivotally mounted in the bracket, as shown clearly in Figure 4, by means of a stud 45 projecting from the guide through an opening provided therefor in the bracket and held against withdrawal by any convenient means, such as a pin 46. Fitted slidably in the rear end of the sleeve 43 is a pin or rod 47 which extends therefrom and is pivoted to a link 48 which is pivoted at its rear end to a crank 49 secured to and depending from a rock shaft 50 which is mounted in bearings upon the chassis of the vehicle and is disposed transversely of the vehicle. Adjacent one end of the rock shaft, an upstanding crank 51 is secured thereto in alinement with the pendent crank 49 and to the crank 51 is pivoted a rod 52 which extends forwardly and is operatively connected to the throttle valve in the carburetor of the engine. A retractile spring 53 is attached to the crank 49 and to some fixed point upon the power plant or the chassis of the vehicle and serves to normally hold the parts in the throttle-closed position. When it is desired to speed up the engine, the accelerator pedal is pressed forwardly by the sole portion of the chauffeur's foot and the accelerator rod 35 is thereby caused to slide downwardly and forwardly through the bearing 36. The movement of the rod 35 will be transmitted to the lever 39 so as to rock the same in the direction indicated by the arrow in Figure 1, and thereby cause the rod 42 to slide rearwardly and impinge against the end of the rod 47 so that the crank 49 and the shaft 50 will be rocked. The movement of the shaft 50 will be transmitted through the crank 51 and the connecting rod 52 to the throttle valve of the carburetor so that the valve will be opened and a more plentiful supply of gas admitted to the engine. When the brake is applied the crank 13 will be rocked and the pivot 40 will consequently swing forwardly, but this action will not open the throttle valve inasmuch as the rod 42 will then merely slide forward in the sleeve or guide 43 and will, consequently, move away from the end of the rod 47 so that the latter will remain at rest. If the throttle valve of the carbureter is open, the rod 47 will follow the rod 42 until the valve is closed and the rod 42 then moves away from the rod 47. In the normal position of the parts, however, the abutting ends of the rods 42 and 47 are close together, if not in actual contact, and, therefore, the movement of the accelerator pedal 33 will be transmitted quickly through the associated elements to the rod 47 and thence, as described, to the throttle valve.

From the foregoing description, taken in connection with the accompanying drawings, it will be readily seen that I have provided a very simple and compact mechanism whereby the brake and the accelerator may be operated at will without requiring any shifting of the operator's foot. Ordinarily, especially when traveling in crowded traffic, the chauffeur, operating the motor vehicle, is required to frequently shift his foot between the brake pedal and the accelerator so that, after a run of any appreciable duration, there is apt to be a weariness and a wearing fatigue experienced in the foot and leg. This disagreeable result of operating a motor vehicle is eliminated by my invention and safety in the control of the vehicle is assured inasmuch as the chauffeur has his foot constantly on the brake pedal and may apply the brakes instantly when the occasion arises. By establishing proper pressure in the cylinder 27, the piston 26 therein may be held in its forward position and it, in turn, acting through the crank 24, will hold the rock shaft 9 and the crank 13 thereon in brake-released position, so that the operation of the accelerator will not cause simultaneous application of the brakes and either pedal may be operated independently of the other pedal. It will be understood, of course, that various changes in the details of construction and arrangement may be made without departing from the invention as the same is defined in the following claims.

Having thus described the invention, I claim:

1. A mechanism for controlling a motor vehicle comprising an accelerator pedal rod mounted for reciprocating movement, a brake pedal rod slidably mounted adjacent the accelerator rod and free from the accelerator rod, connections between the former rod and the throttle valve of the vehicle engine, connections between the latter rod and the brakes of the vehicle, and pedals for actuating the respective rods hingedly mounted upon the brake pedal rod by a pivot pin common to both pedals whereby one pedal may have tilting movement relative to the other.

2. In mechanism for controlling a motor vehicle, an accelerator pedal rod, a brake pedal rod mounted adjacent the accelerator pedal rod and below the same, an accelerator pedal hinged upon the rear end of the brake pedal rod and normally extending upwardly therefrom to bear upon and actuate the accelerator pedal rod, and a brake pedal hinged upon the rear end of the brake pedal rod independently of the accelerator pedal and depending therefrom, the brake pedal having its upper end projecting under the brake pedal rod whereby to abut the same and have its forwardly swinging movement limited.

3. In mechanism for controlling a motor vehicle, a rock shaft, a crank secured upon said rock shaft, connections between said crank and the brake mechanism of the vehicle, a second crank on the rock shaft, a cylinder supported in advance of the rock shaft, a suction pipe extending between said cylinder and the intake manifold of the vehicle engine, a valve for controlling suction through said pipe and regulating vacuum in the cylinder, a piston mounted in said cylinder, and connections between said piston and the second crank on the rock shaft whereby the brakes will be held normally released.

4. In mechanism for controlling a motor vehicle, a rock shaft, a crank secured upon said rock shaft, connections between said crank and the brake mechanism of the vehicle, a second crank on the rock shaft, a cylinder supported in advance of the rock shaft, a suction pipe extending between said cylinder and the intake manifold of the vehicle engine, a piston mounted in said cylinder, connections between said piston and the second crank on the rock shaft whereby the brakes will be held normally released, a brake pedal rod slidably mounted in the floor of the vehicle, a pin extending through the upper end of the first-mentioned crank, a link having one end connected with the brake pedal rod and its other end connected with the pin, a lever pivoted intermediate its length upon said pin, an accelerator rod slidably mounted and pivoted to the upper end of said lever, means for connecting the lower end of the lever with a throttle valve of an engine, a pedal pivoted upon and depending from the upper end of said brake pedal rod, a second pedal pivoted to the brake pedal rod and overlying the accelerator rod, and means for limiting the relative swinging movement of the brake pedal.

5. In mechanism for controlling a motor vehicle, a rock shaft, a crank on said rock shaft, a brake pedal rod connected with said crank to apply the brakes, connections between said crank and the brakes, a lever fulcrumed upon the upper end of said crank and extending above and below the same, connections between the lower end of said lever and the throttle valve of the vehicle engine, an accelerator pedal rod connected with the upper end of said lever, and a pedal having a pivot in common with the brake pedal and bearing upon the free end of the accelerator pedal rod.

6. In mechanism for controlling a motor vehicle, a rock shaft, a crank on said shaft operatively connected with the throttle valve of the vehicle engine, a second crank on the shaft alined with the first crank, a slidably mounted rod connected with the second crank, an accelerator pedal rod, a slidable rod operatively connected with the accelerator pedal rod and disposed longitudinally of the first-mentioned slidable rod in end to end relation thereto and adapted to abut the same, and a bearing slidably receiving abutting end portions of said rods and pivotally mounted intermediate its length.

7. In mechanism for controlling a motor vehicle, a rock shaft, a crank on the rock shaft connected with the vehicle brakes, a brake pedal rod connected with said crank, a lever fulcrumed between its ends upon said crank, an accelerator pedal rod connected with the upper end of said lever, pedals pivotally mounted upon the front end of the brake pedal rod, and arranged to operate the brake pedal rod and the accelerator pedal rod respectively, and lost-motion connections between the lower end of the lever and the throttle valve of the vehicle engine whereby pressure upon the accelerator pedal will operate the throttle valve and pressure upon the brake pedal will rock the lever without actuating the throttle valve.

RALPH A. POLETE.